May 25, 1965  F. W. LOY  3,185,183
WIRE CONNECTING APPARATUS
Filed Sept. 26, 1960  10 Sheets-Sheet 4

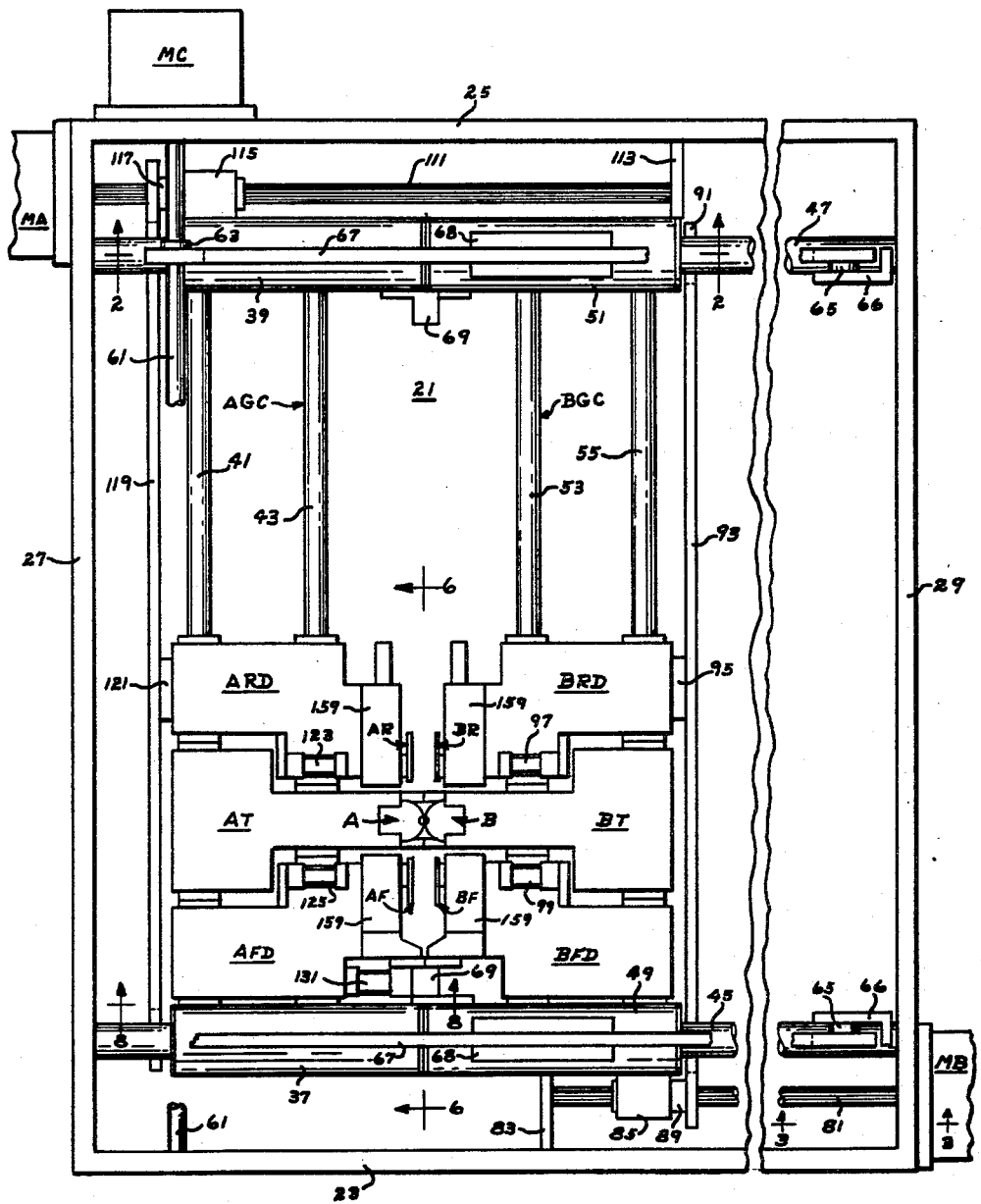

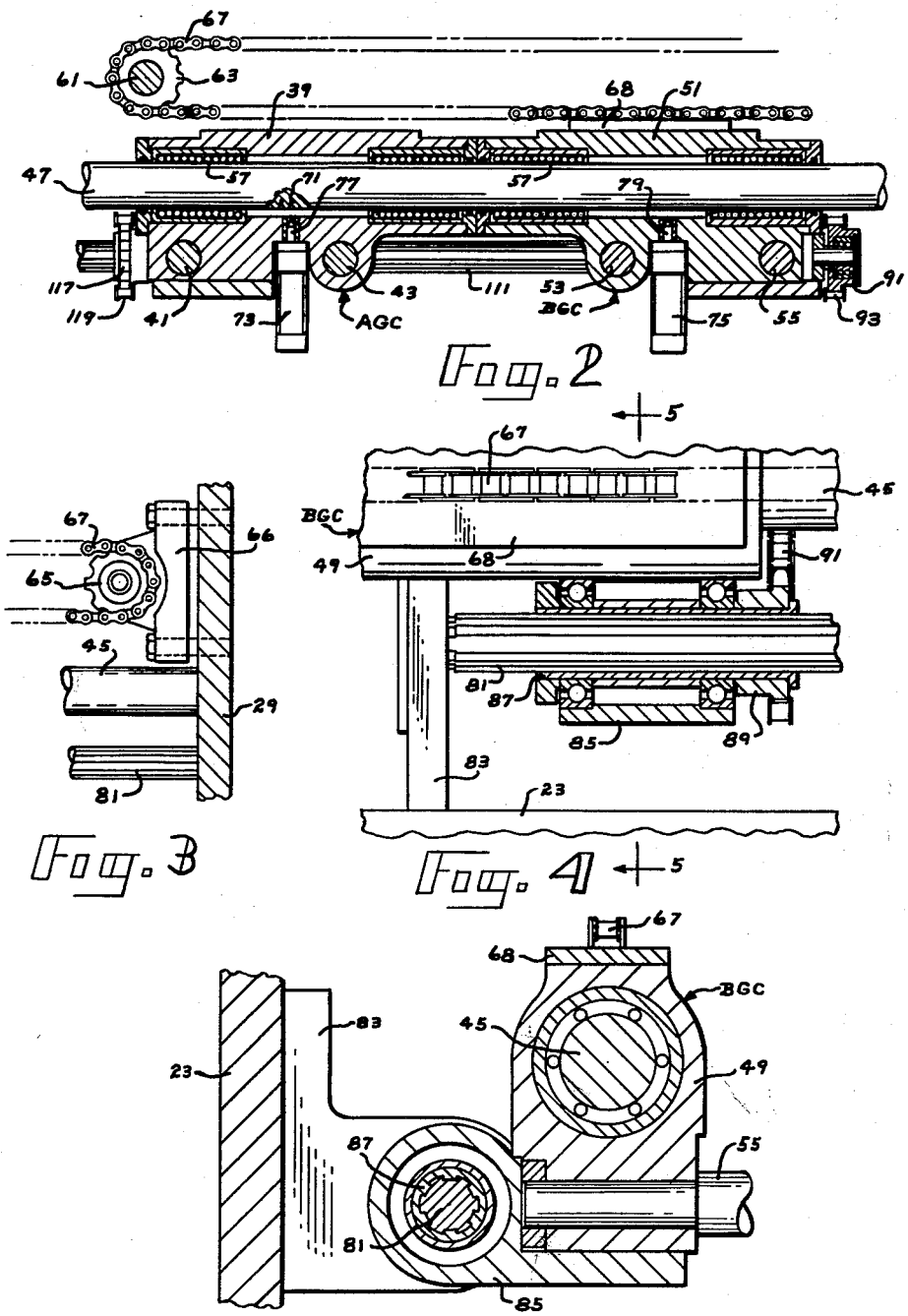

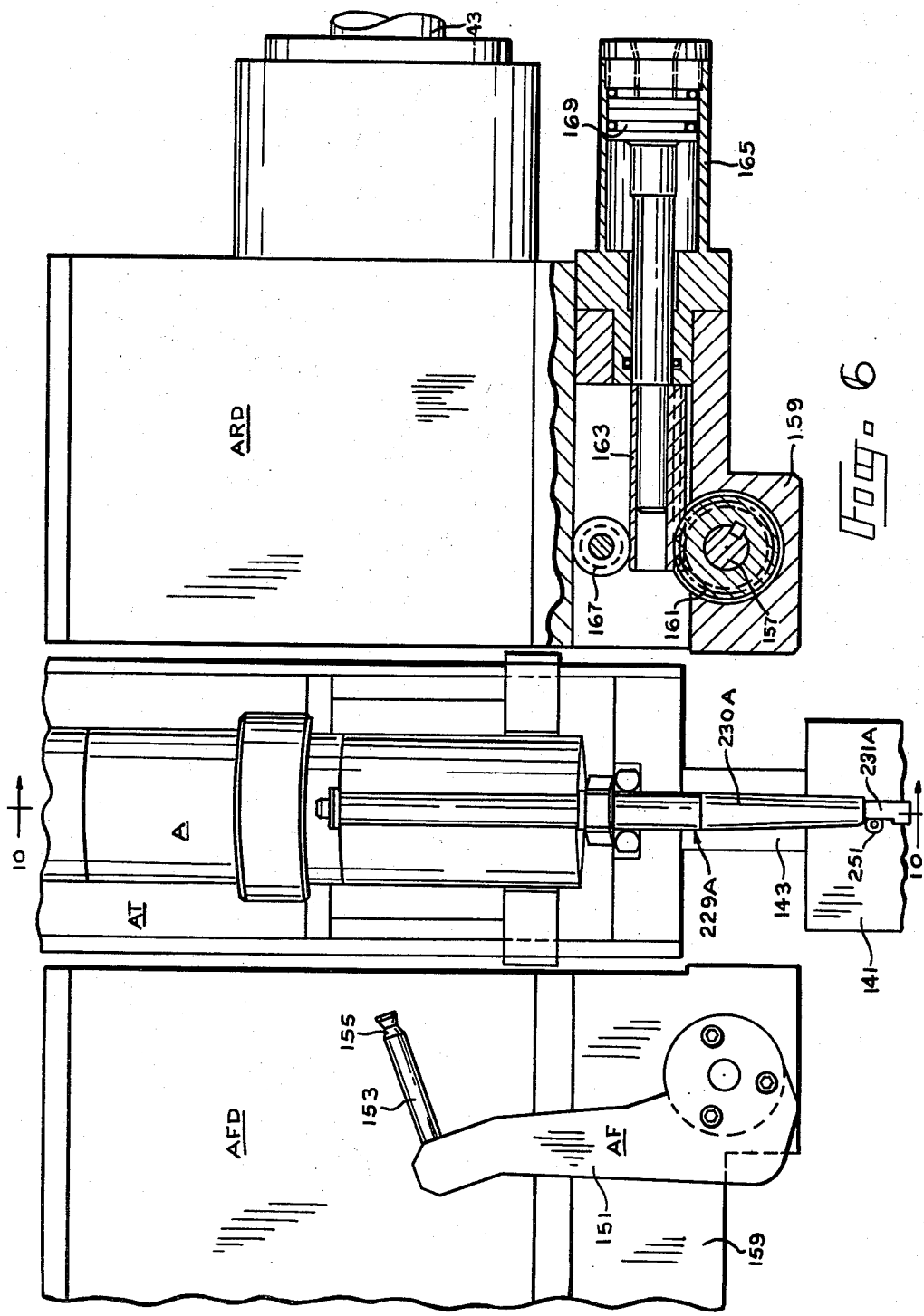

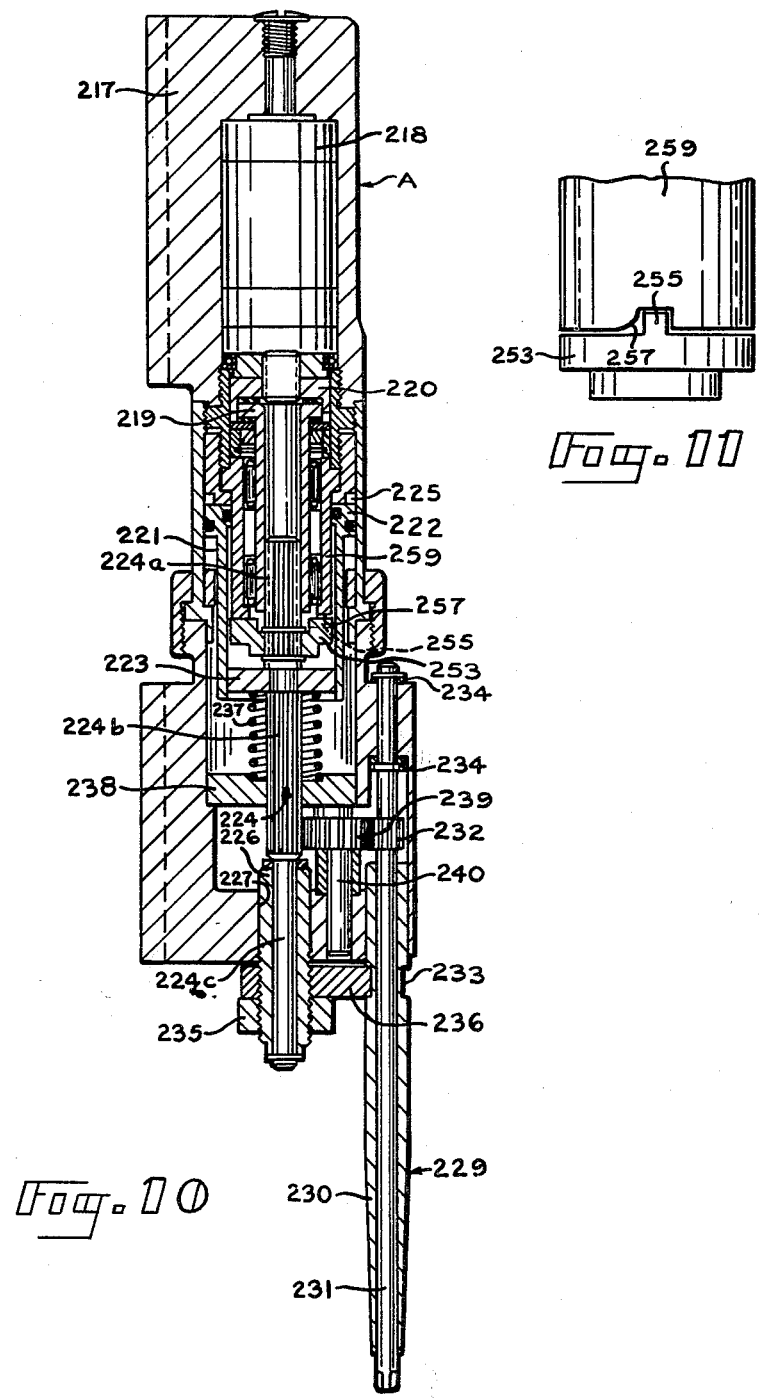

May 25, 1965 F. W. LOY 3,185,183

WIRE CONNECTING APPARATUS

Filed Sept. 26, 1960 10 Sheets—Sheet 10

United States Patent Office 3,185,183
Patented May 25, 1965

3,185,183
WIRE CONNECTING APPARATUS
Fred W. Loy, Fruitland Township, Muskegon County, Mich., assignor to Gardner-Denver Company, a corporation of Delaware
Filed Sept. 26, 1960, Ser. No. 58,380
14 Claims. (Cl. 140—71)

This invention relates to apparatus for connecting wires between pairs of terminals; and more particularly to apparatus for forming a variety of patterns of wires which are connected between pairs of terminals which are mounted in an array on a panel.

Recently there have been developed tools for making solderless, wrapped wire connections of a wire to a terminal. A manually operated tool of this type is described in Shaff U.S. Patent 2,732,139, issued January 24, 1956. In this tool, the stripped end of a wire is loaded in a wrapping tool by insertion into an axial opening in the tool bit. A modified form of tool is described in Bos and Shulters U.S. Patent 2,884,685, issued May 5, 1959, for use with wrapping bits of a side loading type such as are described in Bos and Shulters U.S. Patent 2,885,764, issued May 12, 1959. Side loading bits are loaded by laying the wires transversely across the bit, and the tool is then actuated to close the bit to clamp the wire for the wrapping operation.

Machines are presently known which employ two wrapping tools having side loading bits and which incorporate automatic means for positioning the tools over selected terminals of a wiring panel and for effecting connections of the wire to the terminals. In these machines, the variety of patterns, in which the wire may be laid between selected terminals on a panel has been limited. In the wiring of a single large panel, or in an array of electrical units which effectively define a single large panel, a great number of connections may be required and the wires connected between the terminals must be laid between rows of terminals. If this wiring is done by a machine which provides only a limited number of wire patterns, a problem of wire density is created; that is, the distribution of the wire over the panel is insufficient so that too many wires may be laid in a single row space between two rows of terminals. For this reason, the industry is demanding that wire connecting machines provide a greater variety of wiring patterns to eliminate this problem.

In accordance with the present invention, an improved wiring apparatus, which may be a part of an automatic wiring machine, is provided for the laying of wire on a panel in a great variety of patterns, and in a variety of patterns which cannot be accomplished by machines known heretofore.

Accordingly, an object of this invention is to provide an improved apparatus for laying wire on a panel.

Another object of this invention is to provide novel apparatus for laying wire on a panel in a great variety of patterns to eliminate the problem of wire density.

A further object of this invention is to provide a novel combination of tools, dressing fingers, and positioning means for effecting a great variety of wiring patterns.

A still further object of this invention is to provide a novel dressing finger for cooperation with wiring tools to effect a variety of wiring patterns.

The novel features of the invention, as well as additional objects and advantages thereof, will be understood more fully from the following description when read in connection with the accompanying drawings, in which:

FIGURE 1 is a diagrammatic top view of a wiring apparatus showing the several components in the home positions;

FIGURE 2 is a vertical section taken along the line 2—2 of FIGURE 1 looking in the direction of appended arrows;

FIGURE 3 is a fragmentary view taken along the line 3—3 of FIGURE 1 looking in the direction of the appended arrows;

FIGURE 4 is a fragmentary plan view, partially in section, of a portion of the apparatus shown in FIGURE 1;

FIGURE 5 is a sectional view taken along the line 5—5 of FIGURE 4 looking in the direction of the appended arrows;

FIGURE 6 is an elevation view taken along the line 6—6 of FIGURE 1, looking in the direction of the appended arrows, and showing the relationship of a tool carriage and associated dressing finger carriages.

FIGURE 10 is a sectional view of a wrapping tool taken along the line 10—10 of FIGURE 6 looking in the direction of the appended arrows;

FIGURE 11 is a fragmentary view of several elements of the tool shown in FIGURE 10;

Figure 7:
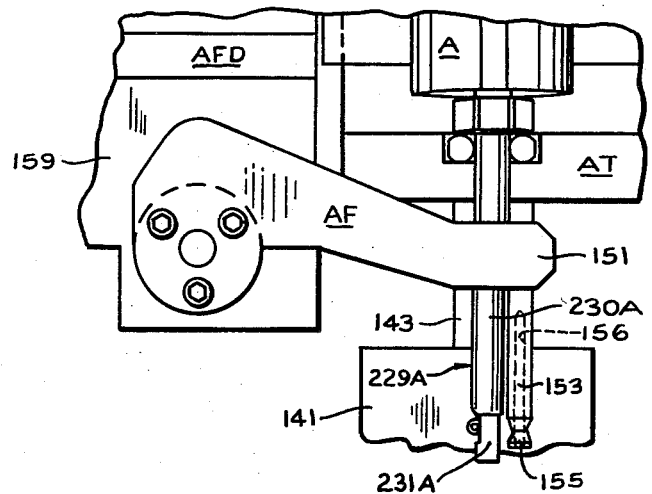
FIGURE 7 is a fragmentary elevational view, relating to FIGURE 6, showing a dressing finger in wire engaging position.

Referring now to the drawings, FIGURE 1 is a top view of a preferred embodiment of a machine, according to the present invention, and diagrammatically illustrates the general arrangement of the major components of the machine. The front of the machine is shown at the bottom of FIGURE 1. An enclosing housing for the illustrated components of the machine includes a base plate 21, a front wall 23, a rear wall 25, and side walls 27 and 29.

Figure 8:
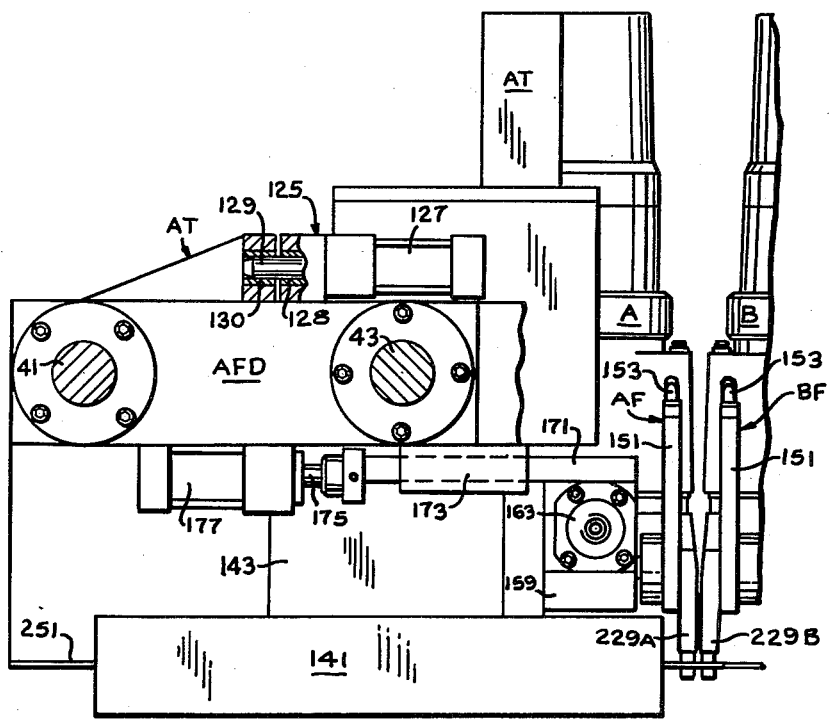
FIGURE 8 is a front elevation view taken along the line 8—8 of FIG. 1 looking in the direction of the appended arrows, showing the relationship of the two wiring tools and associated dressing fingers.

A wiring panel 31, illustrated diagrammatically in FIGURE 8, is secured to a suitable fixture on the base plate 21. The panel has a plurality of perpendicularly extending terminals 33 and is disposed horizontally so that the terminals extend upward. The terminals are arranged in a coordinate grid pattern defining rows of terminals. The panel is positioned with respect to the machine so that rows of terminals are defined along X coordinate axes, which are parallel to the front wall 23 of the machine; rows of terminals are defined along Y coordinate axes, which are perpendicular to the X coordinate axes and parallel to the side walls 25 and 27 of the machine; and rows of terminals are defined at angles with respect to the X and Y coordinate axes.

The wrapped connections are made by two wrapping tools A and B. These tools are moved in a horizontal plane, over the panel 31, by a mechanism to be described. Several dressing fingers AF, AR, BF and BR are also moved in a horizontal plane over the panel and cooperate with the tools A and B to define the various patterns which the machine is capable of making. The variety of patterns will be described subsequently. The tools and dressing fingers have "home" positions which are located adjacent to the left front corner of the machine as shown in FIGURE 1 and, correspondingly, adjacent to the left front corner of the wiring panel. Movements of the tools and dressing fingers along X coordinate axes will be termed X motion or movement in an X direction. Movement of the tools and dressing fingers along Y coordinate axes will be termed Y motion or movement in a Y direction. For the making of each connection, the tools and dressing fingers start at the home positions and are moved away from the home positions to position the wrapping tools over preselected terminals at predetermined XY coordinate positions and to position certain of the dressing fingers at predetermined XY coordinate positions to define a predetermined pattern for the wire between the preselected terminals. The movements in X and Y directions are in terms of modules of movement from the home position, as determined by the coordinate grid system built into the machine; and movement of a component from one X or Y coordinate position to an adjacent X or Y coordinate position is termed one module of movement. Certain X and Y movements may occur simultaneously rather than independently.

The stripped leading end of a continuous length of wire is fed to and gripped by the tool B and is pulled by the tool B, which makes the connection further away from the home position, away from the tool A. Appropriate dressing fingers engage the wire to define the predetermined pattern. The wire is then cut and stripped adjacent to the tool A and the stripped trailing end of the wire is then gripped by the tool A. Following this, relative vertical movement between the tools and dressing fingers, on the one hand, and the panel, on the other hand, lays the wires between the rows of terminals; then the tools are actuated to wrap the ends of the wire on the terminals and the wire is released. The tool and dressing fingers are then returned to the home positions for a succeeding cycle.

X motion for the above mentioned tools and dressing fingers is provided by carriers AGC and BGC. The carrier AGC comprises a forward end housing 37, a rearward end housing 39 and interconnecting slide rods 41 and 43. This carrier is supported on forward slide rod 45 and rearward slide rod 47 both of which are mounted in the side walls of the machine, parallel to the front and rear walls. The carrier AGC is disposed at the left side of the machine (as viewed in FIGURE 1) and the carrier BGC is disposed at the right side of the machine and is carried on the same slide rods 45 and 47. The carrier BGC is similar in construction and comprises a forward housing 49, a rearward housing 51, and interconnecting slide rods 53 and 55. The slide rods 41, 43 and 53, 55 extend parallel to the side walls of the machine. FIGURE 2 is a vertical section through the rearward slide rod 47 illustrating the bearing means 57 by which the carriers AGC and BGC are carried for free reciprocating movement on the slide rods.

Y motion for the tools and dressing fingers is provided by several carriages which are mounted for reciprocating movement on the slide rods of the carriers AGC and BGC. An A group of carriages, which are mounted on the slide rods 41 and 43 of the carrier AGC, includes a tool carriage AT, which carries the tool A; a rear dressing finger carriage ARD, which is rearward of the carriage AT and carries rear dressing finger AR; and a forward dressing finger carriage AFD, which is forward of the carriage AT and carries the forward dressing finger AF. Similarly, a B group of carriages includes a tool carriage BT, which carries the tool B; a rear dressing finger carriage BRD, which carries the rear dressing finger BR; and a forward dressing finger carriage BFD, which carries the forward dressing finger BF.

The drive means for the carriers AGC and BGC is best shown in FIGURES 1 through 3. A driveshaft 61, located at the left side of the machine, is rotatably supported in the front and rear walls 23 and 25 and is directly driven by a reversible drive motor MC, mounted outside the rear wall of the machine. This driveshaft is disposed above the carriers, as best shown in FIG. 2, and has two sprockets 63 (one not shown) nonrotatably fixed thereon and disposed above the end housings 37 and 39 of the carrier AGC. Cooperating sprockets 65 are rotatably supported in brackets 66 adjustably mounted on the right side wall 29 of the machine opposite from the sprockets 63, as best shown in FIGS. 1 and 3. Two roller chains 67, carried by the sprockets 63 and 65, pass directly over the end housings of the carriers AGC and BGC. The chains 67 are secured, respectively, to the forward and rearward end housings of the carrier BGC, by means of adjustable brackets 68, so that this carrier is directly reciprocated by the motor MC.

The carrier AGC may be coupled to the carrier BGC through selectively actuable interlocks 69, which will be described in detail subsequently. Through these interlocks, the carrier AGC is reciprocated by the motor MC which serves to drive either the carriers BGC and AGC together or the carrier BGC independently, when the carriers are moved away from the home positions. When the carriers are returned to the home position, the carrier AGC is pushed by the carrier BGC.

The manner in which the carriers are moved to predetermined X coordinate positions will be referred to subsequently. In general, the carriers are positioned by the motor MC and its associated controls. For accurate positioning of the carriers with respect to the slide rods 45 and 47, the slide rods are provided with spaced tapered holes 71, as shown in FIGURE 2, according to the coordinate grid spacing of the machine. Each of the carrier end housings is provided with a double acting air cylinder assembly which actuates a taper pin selectively into and out of engagement with the tapered holes. After the carriers have been positioned by the motor MC, the taper pins are engaged in the holes to accurately position the carriers and hold the carriers in position, relative to the slide rods, until the wrapping cycle has been completed. In FIGURE 2, the rear end housings of the carriers AGC and BGC are shown along with respective taper pin assemblies 73 and 75, and respective taper pins 77 and 79.

Separate power means are provided for reciprocating the A group of carriages and the B group of carriages on their respective carriers AGC and BGC. The power means for the B group of carriages is best shown in FIGURES 1, 4 and 5 and includes a spline driveshaft 81 located at the front of the machine and rotatably supported in the right side wall 29 and a bracket 83, fixed to the front wall 23. The spline shaft 81 is driven by a reversible drive motor MB, mounted outside the right side wall of the machine. A bearing housing 85, mounted on the forward end housing 49 of the carrier BGC, rotatably supports an internally splined sleeve 87 having a sprocket 89 non-rotatably fixed thereto. The spline shaft 81 passes through the splined sleeve 87, driving the sleeve and sprocket. A cooperating sprocket 91 is rotatably mounted on the rear end housing 51 of the carrier BGC as best shown in FIGURE 2. A roller chain 93, supported by the sprockets 89 and 91, passes along the right side of the carriages BFD, BT and BRD and is secured to the carriage BRD by means of an adjustable bracket 95. It will be seen then that the rear dressing finger carriage BRD is directly reciprocated on the slide rods 53 and 55 of the carrier BGC by the drive motor MB. A selectively actuable interlock 97 is provided for coupling the tool carriage BT to the carriage BRD. Another selectively actuable interlock 99 is provided for coupling the forward dressing finger carriage BFD to the carriage BT. It will now be seen that the carriage BRD is the only carriage which is directly driven by the motor MB, and that the carriages BT and BFD are driven, through the carriage BRD, in accordance with the selected conditions of the interlocks 97 and 99.

The A group of carriages is powered in a similar manner by a reversible drive motor MA driving a spline driveshaft 111, rotatably supported in the left side wall 27 and a bracket 113, fixed to the rear wall 25 of the machine. A bearing housing 115, mounted on the rear end housing 39 of the carrier AGC, rotatably supports a splined sleeve carrying non-rotatably fixed sprocket 117. A roller chain 119 is carried by the sprocket 117 and a cooperating sprocket (not shown), which is mounted on the forward end housing 37 of the carrier AGC. This chain is connected to the rear dressing finger carriage ARD by means of an adjustable bracket 121, so that this carriage is directly reciprocated by the drive motor MA. An interlock 123 couples the tool carriage AT to the carriage ARD, and an interlock 125 couples the forward dressing finger carriage AFD to the carriage AT. Here again, only the carriage ARD is driven directly by the motor MA and the carriages AT and AFD are selectively driven, away from the home positions, through the interlocks 123 and 125.

The interlock 125, which couples the tool carriage AT and the forward dressing finger carriage AFD, is best shown in FIGURE 8. This interlock includes a double-acting air cylinder assembly 127, which is fixed to the carriage AFD and which directly reciprocates a shot pin 129. This shot pin reciprocates in a bushing 128 mounted in the cylinder assembly and in a bushing 130 mounted in a portion of the carriage AT. When the shot pin 129 is extended, as shown in FIGURE 8, the carriage AFD is coupled to the carriage AT and will be moved in a Y direction along with the carriage AT. If the shot pin is retracted, as shown by the dotted lines, the carriage AFD may be locked in position, on the carriage AGC, and the carriage AT moved to a different Y coordinate position.

All of the above mentioned interlocks 69, 97, 99, 123 and 125 are similar in structure to the interlock 125. An additional interlock 131, of similar structure, is provided to couple the carriages AFD and BFD together. This interlock is engaged only when all of the above mentioned interlocks are also engaged and therefore locks the A group and B group of carriages together to coordinate Y movement of the B group and B group of carriages. When it is intended to move the A group and the B group of carriages together in a Y direction, both the motors MA and MB are actuated. Since these motors are independent, relative Y movement may occur between the groups, and hence between the tools A and B, and this may result in some undesirable withdrawing of wire by the tool B with respect to the tool A. The interlock 131 is provided, therefor, to maintain the tools A and B adjacent each other even though they are driven in a Y direction by independent drive motors.

The slide rods 41 and 55 of the carriers AGC and BGC respectively are provided, on their undersides, with tapered holes similar to the tapered holes 71 provided in the slide rods 45 and 47. Each of the carriages AFD, AT, ARD, BFD, BT and BRD is provided with a taper pin assembly, similar to those described for the carriers AGC and BGC, for engaging the tapered holes in the respective slide rods. These are provided for accurately positioning and locking the individual carriages, in a manner similar to that described for the carriers, after the carriages have been positioned by their respective drive motors.

The motors MC, MB and MA are similar and may be of any known type, actuated electrically, hydraulically, or pneumatically for example. These motors are reversible and are susceptible to being controlled, by a suitable control means, for accurately positioning the driven members.

The wire wrapping tools A and B, which are carried by respective carriages AT and BT, are particularly shown in FIGURES 6 and 8 in their relation to each other and to the other components of the machine in the home position. The structure of the tool A and its associated bit are particularly shown in FIGURE 10 and associated FIGURES 11 through 13. The A and B tools are identical in structure except that they are designed to drive respective bits in opposite directions of rotation. Where applicable, certain elements of the tool A are identified and illustrated by reference numerals with the subscript A, and identical elements for the tool B are identified by the same reference numerals with the subscript B.

Referring now particularly to FIGURES 10 and 11, the tool comprises a generally cylindrical elongated housing having a longitudinal dove tail 217, in two alined sections, for engagement with a dove tail clamp of the carriage AT for the purpose of supporting the tool. The housing encloses a rotary vane air motor 218 at its upper end, the motor driving an internally splined driveshaft 219 through a friction clutch 220. A sleeve 221, having an integral annular piston 222 at its upper end, is confined within an annular cylinder chamber 225 defined by the tool housing. A washer 223, having a radial slot, is fixed to the lower end of the sleeve 221. A shaft 224 includes an upper spline portion 224a, received within the splined driveshaft 219 and driven thereby; an intermediate elongated gear portion 224b; and a lower journal portion 224c. An annular groove provided between the spline and gear portions is received within the radial slot of the washer 223. A sleeve bushing 226, axially fixed to the journal portion of the shaft 224 in a manner to permit rotation of the shaft within the bushing, is mounted for axial sliding movement through an opening 227 in the lower end of the tool housing.

The tool element which performs the wrapping operation is a bit 229 comprising a sleeve 230 partially enclosing bit member 231. The bit member and sleeve are coupled by a pin and slot arrangement which permits longitudinal movement of the sleeve with respect to the bit member, and by which the sleeve is rotated with the bit member. The bit member 231 includes an integral gear 232 adjacent to its upper end. The sleeve 230 is rotatably mounted in the tool housing, in suitable bores parallel to the shaft 224 and adjacent to the housing periphery, in a manner permitting axial movement. The bit member is retained for rotation with respect to the housing by snap rings 234, in a manner to prevent axial movement. The sleeve is provided with an annular groove 233 intermediate its ends. A transverse foot member 236 is threaded onto the lower end of the sleeve bushing 226 and secured by a lock nut 235. The foot member is bifurcated defining a fork which receives, and which is received in, the annular groove 233 of the sleeve 230. It will now be seen that axial movement of the sleeve 230 is controlled by the piston 222 through the washer 223, the shaft 224, the sleeve bushing 226, and the foot member 236. A coil spring 237 is confined between the washer 223 and a transverse housing wall 238 to bias the washer, the bit sleeve, and the piston 222, to an uppermost position as shown in FIGURE 10. Air admitted to the chamber 225 above piston 222 moves these members downward. An idler gear 239, rotatably mounted on a shaft 240 couples the gear portion 224b of the shaft 224 and the bit gear 232. It will now be seen that the bit 229 is rotated by the motor 218 through the driveshaft 219, the shaft 224, and the idler gear 239.

In FIGURE 10, the bit sleeve 230 is shown in its uppermost position with respect to bit member 231. This is a normal "open" condition of the bit in which a wire may be fed transversely across the bit adjacent to the exposed lower end of the bit member 231. Details of the lower end of the bit 229 are particularly shown in FIGURES 12 and 13. The lower end of the bit member 231 is provided with a transverse flat, spaced rearwardly from the lower end of the bit member, defining a longitudinal guide surface 243, and a transverse surface 245 at the forward end of the surface 243 disposed substantially parallel with the end face of the bit member. A conventional opening (not shown), for receiving the terminal, is provided in the end of the bit member, and the end face of the bit member is provided with a suitable configuration for effecting the wrapped connection. A wire receiving groove 247 is provided longitudinally on the periphery of the bit member and extends between the end face and the transverse surface 245, merging with the guide surface 243. The sleeve 230 is generally cylindrical and is provided with a longitudinal slot 249, which cooperates with the guide surface 243 of the bit member to receive the wire, as will be described.

Figure 12:
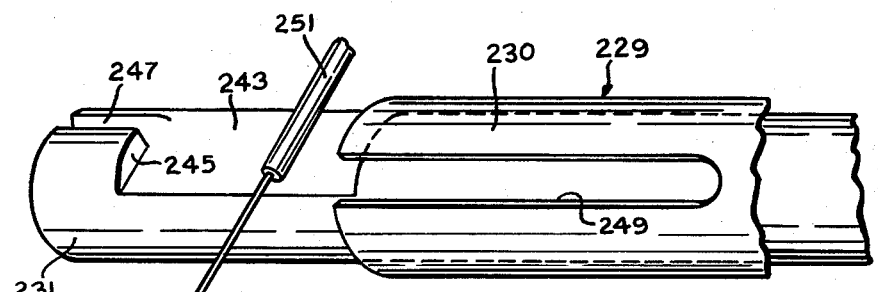
FIGURES 12 and 13 are fragmentary views of a tool wrapping bit.
Figure 13:
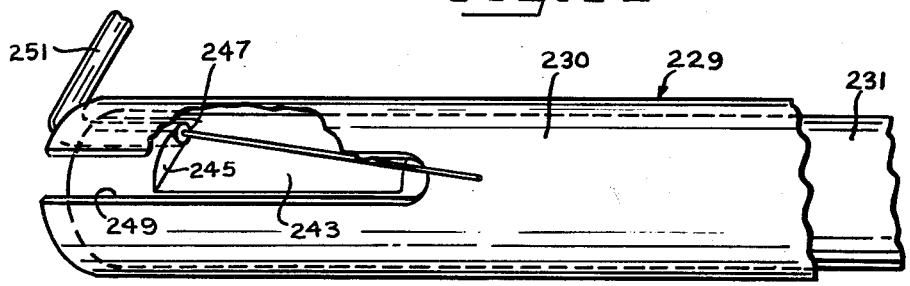

FIGURE 12 shows the bit in the above described open condition, and also shows the stripped end of a wire 251 positioned on the guide surface 243. The bit is now in condition to be "closed," as shown in FIGURE 13. This is accomplished by introducing air to the cylinder 225 above the piston 222 as described above. As the sleeve 230 moves over the bit member 231, the wire 251 is contacted by the lower end of the sleeve and urged toward the transverse surface 245. As this movement continues, the wire engages the rearward end of the wire receiving groove 247 and the opposing forces cause the wires to be bent and to be laid into the wire groove 247 as shown in FIGURE 13, and the wire is now gripped by the bit. The free end of the wire may extend through the slot 249 in the sleeve, as shown. At the lower end of the bit, the wire is bent as shown since the other end of the wire is gripped at the tool B and the wire is now gripped between the two tools. The wire is now in condition to be wrapped on the terminals by the two wrapping bits 229A and 229B.

In a wire wrapping tool as above described, it is essential that the bit always be stopped or indexed in the same rotational position with respect to the tool, since the wire is to be fed across and adjacent to the longitudinal guide surface 243, as above described. FIGURE 11 is an enlarged fragmentary view of a portion of the tool indexing mechanism. A collar 253, having an upwardly extending dog 255, is nonrotatably fixed to the spline portion 224a of the shaft 224 just above the washer 223, by means of snap rings for example. This dog engages a slot 257 in the tool housing member 259, when the shaft 224 is in its uppermost position. In the cycle of operation the bit is first closed, effecting disengagement of the dog 255 from the slot 257, and this permits the motor 218 to rotate the bit when air is directed to the motor. The bit is opened before the motor is stopped, the spring 237 effecting movement of the collar 253 upward to permit the dog 255 to find and engage the slot 257 and stop rotation of the shaft 224 and the bit 229. The bit is then indexed in the proper rotational position. The friction clutch 220 permits rotation of the motor with respect to the driveshaft 219 and the gear shaft 224, after the dog engages the slot.

In FIGURE 8, which is an elevation view from the front of the machine, the relation of the tools A and B and the bits 229A and 229B are shown in the home positions wherein the bits are adjacent to each other in a plane parallel to the front wall 23 of the machine. In this figure there is also shown a stripping and feeding assembly, indicated by a housing 141, which is secured beneath the carriage AT by a bracket 143. This stripping and feeding assembly may be similar to an assembly shown in Bach et al. Patent 2,886,995, issued May 19, 1959 and which functions in a manner shown diagrammatically in FIGURES 9 through 15 of that patent. This device would handle a continuous length of wire 251 which is drawn from a suitable supply reel into the left end of the assembly 141, as shown in FIGURE 8. The assembly automatically cuts the wire and strips the insulation from the wire for a predetermined length at each side of the cut. When the cutting and stripping of the wire is accomplished, the trailing end of the severed portion of the wire is gripped by the tool A, by closing the bit 229A for example, and the severed portion of the wire is then connected to the wiring panel. When the carriages are returned to the home positions, the assembly feeds the stripped leading end of the continuous wire past the tool A to the tool B where it is clamped, by closing the bit 229B for example. In FIGURE 8, the leading end of the wire is shown in position to be clamped by the tool B.

FIGURE 6 is a side elevation view, partially in section, which shows the relation of the carriages AFD, AT and ARD in the home positions. As viewed in this figure, the wire stripping and feeding assembly 141 would feed the wire directly out of the paper.

FIGURES 6 and 7 particularly illustrate the relation of the dressing fingers AF and AR in relation to the wrapping bit 229A. The dressing finger AR (not shown) is identical to the dressing finger AF, but in an opposed position. Until the dressing fingers are moved into position to engage the wire, the dressing fingers are retained in an upper or "cocked" position as shown by the dressing finger AF in FIGURE 6. When the dressing finger is moved to wire engaging position, it is rotated downward to the position shown in FIGURE 7.

The dressing fingers AF, AR, BF and BR are identical. Each consists of an arm 151 having a fixed finger 153 provided with a defined annular groove 155 at its tip to engage the wire. The arm is secured to a collar which is keyed to a shaft 157 which is rotatably supported, and extends from, a dressing finger housing 159. Within the housing 159, a gear 161 is fixed to the shaft 157 and is engaged by a rack 163 fixed to the plunger of a double-acting air cylinder assembly 165. A roller 167 maintains the rack in engagement with the gear 161. The air cylinder assembly 165 includes a piston 169 having an integral plunger which extends from the assembly and has the rack 163 attached. It will be seen then that the dressing finger is selectively rotated between the cocked position and the wire engaging position by the air cylinder assembly 165.

Figure 9:
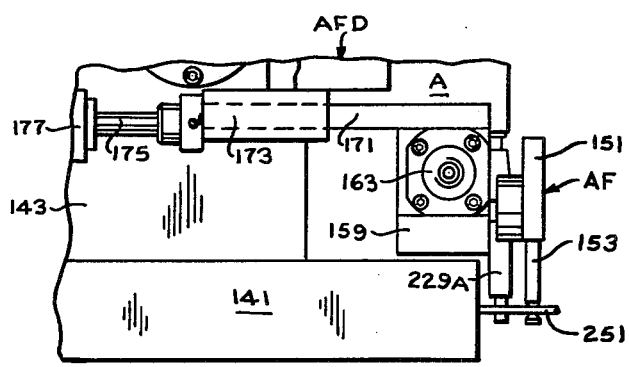
FIGURE 9 is a fragmentary view, relating to FIGURE 8, showing a dressing finger in wire engaging position in relation to a tool bit.

The necessity for rotating the dressing finger is apparent from FIGURE 7 wherein it is noted that, in the wire engaging position, the finger 153 of the dressing finger AF, which is mounted forwardly of the bit 229A, is positioned to the rear of the bit to engage the rearward side of the wire for the purpose of drawing the wire forward with respect to the bit. Similarly, the rear dressing finger AR is mounted rearwardly of the bit 229A and its finger 153 is positioned to engage the forward side of the wire to pull the wire rearward. It is also to be noted, from FIGURES 8 and 9, that when the dressing fingers are in wire engaging position they must lie outside of the bits; and they cannot be retained in these positions when the two bits are adjacent to each other as shown in FIGURE 8. In FIGURE 8, then, the dressing fingers AF and BF are shown in their cocked positions. Before the dressing fingers may be rotated to the wire engaging positions, each dressing finger must be moved outwardly with respect to its carriage as shown in FIGURE 9. The means for accomplishing this is best shown in FIGURES 8 and 9 wherein the housing 159, for the dressing finger AF, is mounted on a slide 171 which is reciprocated within a bracket 173 mounted on the underside of the carriage AFD. The slide 171 is coupled to the plunger 175 of a double-acting air cylinder assembly 177, which is also mounted on the carriage AFD. The air cylinder assembly is similar in structure to the assembly 165 for rotating the dressing finger. FIGURES 7 and 9 particularly illustrate the relation of the dressing finger AF to its associated bit 229A, when the dressing finger is moved outwardly and rotated to the wire engaging position.

In FIGURE 8, a portion of a wiring panel 31 is shown in its relation to the tools, dressing fingers and associated carriages. The vertical relation, such as is shown, is maintained while the wire is formed in a predetermined pattern as will be described. After the wire pattern is formed, the wire cut and stripped adjacent to the tool A, and the severed portion of the wire gripped by the tools A and B, the tools and dressing fingers must be moved toward the panels and over the terminals. This is preferably accomplished, through means not shown, by moving the dressing fingers and tools down to the panel. The fingers 153 of each dressing finger are provided with axial openings 156 extending from the ends thereof to receive terminals, in the event that the fingers are positioned over a terminal.

It will be apparent from the foregoing description that a machine embodying the above described apparatus is preferably operated by air. The drive motors MA, MB and MC are preferably controlled by a suitable electric programming circuit which receive XY coordinate information, either from an operator through a control panel or from an automatic device such as a tape reader, and actuates the motors to position the carriers and carriages accordingly. The same programming circuit may program and control other functions of the machine, namely those controlled by the above described air cylinder assemblies, through a suitable pneumatic circuit. Since the control means is not a part of the present invention, these are not described herein.

Figure 16:
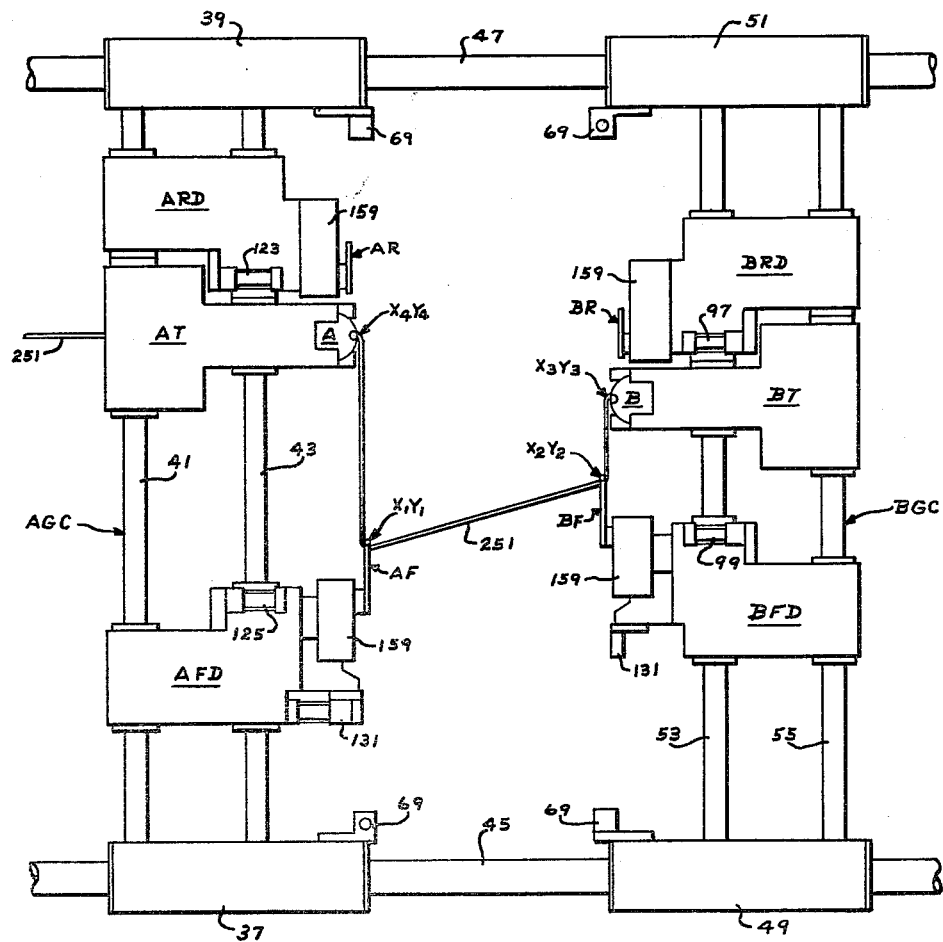

An operating cycle of the above described machine will now be described with particular reference to FIGURES 1, 14, 15 and 16. The cycle to be described produces a U-shaped pattern of the wire 251 as shown in FIGURE 16. At the beginning of an operating cycle, the carriers AGC and BGC and the carriages AFD, AT, ARD, BFD, BT AND BRD are in their respective home positions as shown in FIGURE 1. All of the dressing fingers AF, AR, BF and BR are in the cocked positions, and all of the interlocks 69, 97, 99, 123, 125 and 131 are engaged. The carrier AGC is then coupled to the carrier BGC; the carriages AT and AFD are coupled to the carriage ARD; the carriages BT and BFD are coupled to the carriage BRD; and the carriages AFD and BFD are coupled together to couple the A and B groups of carriages together. The stripped, leading end of a continuous wire 251 is fed to the tool B and is clamped by the tool B by closing its bit 229B for example.

Figure 14:
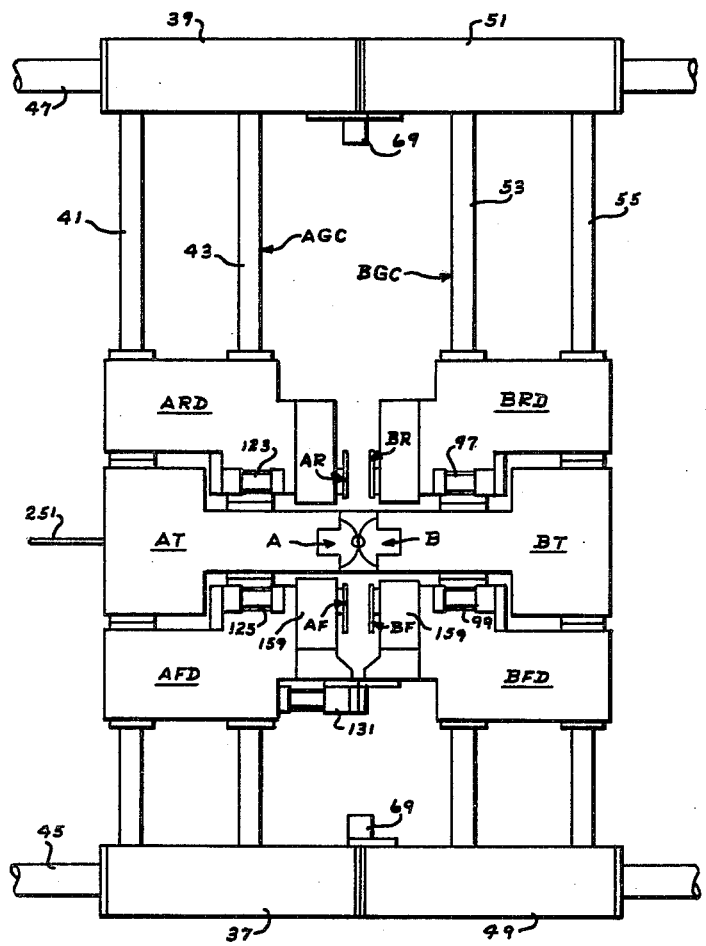
FIGURES 14, 15 and 16 are diagrammatic plan views, similar in part to FIGURE 1, showing several stages of operation of the wiring apparatus.
Figure 15:
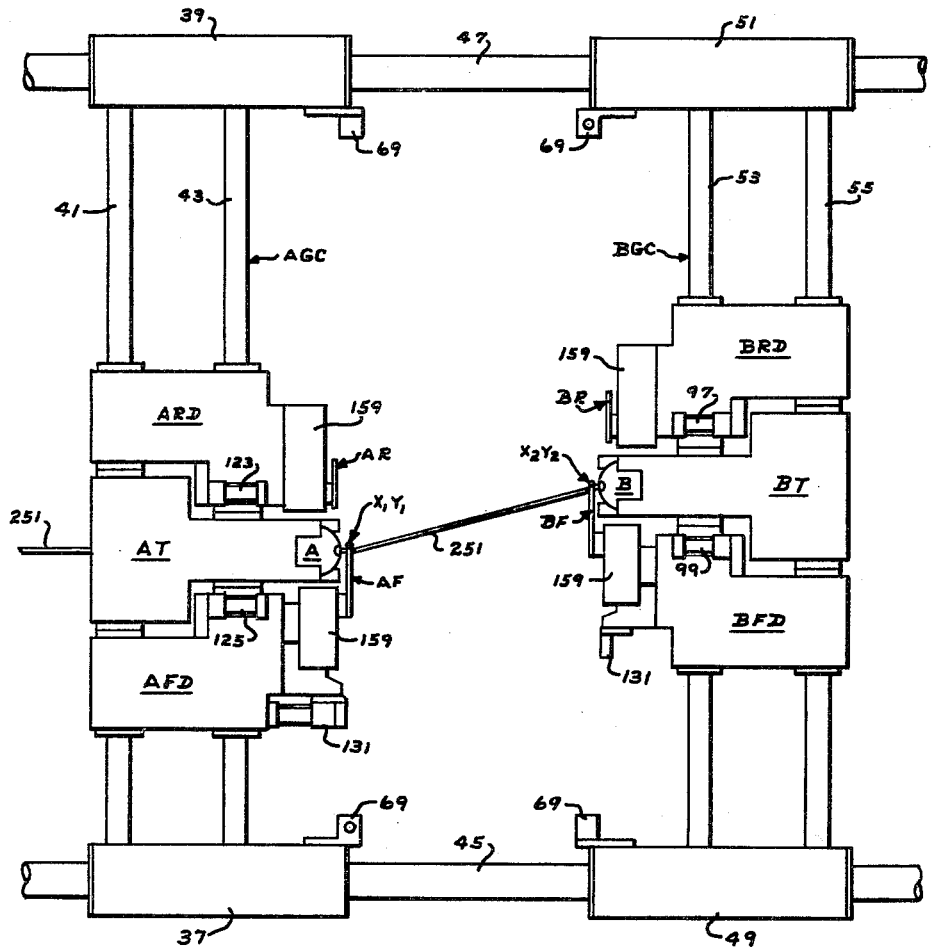

To produce the pattern shown in FIGURE 16, the dressing finger carriage AFD must first be moved to a predetermined coordinate position X1, Y1, which is determined by the position of the finger 153 of the dressing finger AF when it is in wire engaging position. Accordingly, the motor MC is actuated to move both carriers in the X direction to the coordinate position X1; and the motors MA and MB are actuated to move the A group and B group of carriages in a Y direction to the coordinate position Y1. These X and Y movements may occur simultaneously. FIGURE 14 shows the positions of the carriers and carriages when the carriage AFD has been positioned at the coordinate position X1, Y1. The taper pin assemblies 73 of the carrier AGC are now actuated to accurately position and lock this carrier with respect to the slide rods 45 and 47. The taper pin assembly of the carriage AFD is also actuated to accurately position and lock this carriage with respect to the slide rod 41.

The next step in the cycle is to position the carriage BFD at a coordinate position X2, Y2, which is the position of the finger 153 of dressing finger BF in the wire engaging position. To accomplish this the interlocks 69, between the carriers AGC and BGC, and the interlock 131, between carriages AFD and BFD are disengaged. The carrier BGC is then moved in an X direction, to the coordinate position X2, by the motor MC; and the B group of carriages is moved to the coordinate position Y2, by the motor MB. Again, these X and Y movements may occur simultaneously. During these movements, the wire 251 is drawn by the tool B through the wire stripping and feeding assembly 141. The taper pin assemblies 75 of the carrier BGC are now actuated to accurately position and lock this carrier with respect to the slide rods 45 and 47. The taper pin assembly for the carriage BFD is also actuated to accurately position and lock this carriage with respect to the slide rod 55 of the carrier BGC. The dressing fingers AF and BF are now moved to wire engaging positions and engage the rearward side of the wire 251, at coordinate positions X1, Y1 and X2, Y2, respectively. The carriers and carriages are now in the positions shown in FIGURE 15.

The next step in the cycle is to position the tool B at a coordinate position X3, Y3. The X coordinate position has already been fixed by the previous X movement of the carrier BGC. The interlock 99, between the carriages BT and BFD is now disengaged and the motor MB is actuated to move the carriages BRD and BT in a Y direction to the coordinate position Y3. During this movement the wire 251 is drawn by the tool B around the dressing finger BF to form the lower right hand corner of the U-shaped pattern as shown in FIGURE 16. The taper pin assembly of the carriage BT is then actuated to accurately position and lock this carriage with respect to the slide rod 55 of the carrier BGC.

The other leg of the U-shaped pattern is then formed by disengaging the interlock 125 between the carriages AT and AFD and actuating the motor MA to move the carriages ARD and AT to position the tool A at the coordinate position Y4. The coordinate position X4 had been determined by the initial X movement of the carrier AGC. The taper pin assembly of the carriage AT is then actuated to accurately position and lock the carriage AT with respect to the slide rod 41 of the carrier AGC. The wire stripping and feeding assembly 141 is then actuated to cut and strip the wire adjacent to the tool A and the wire is clamped by the tool A by closing its bit 229A for example.

The pattern is now completed, as shown in FIGURE 16, to connect the wire 251 between terminals 33 located at coordinate positions X3, Y3 and X4, Y4, and to lay the wire between appropriate rows of terminals. The tools A and B are then actuated to wrap the ends of the severed portions of the wire 251 on the respective terminals. The motors MA, MB and MC are then actuated in a reverse direction to move all of the carriers and carriages to their respective home positions for a succeeding cycle.

Figure 17:
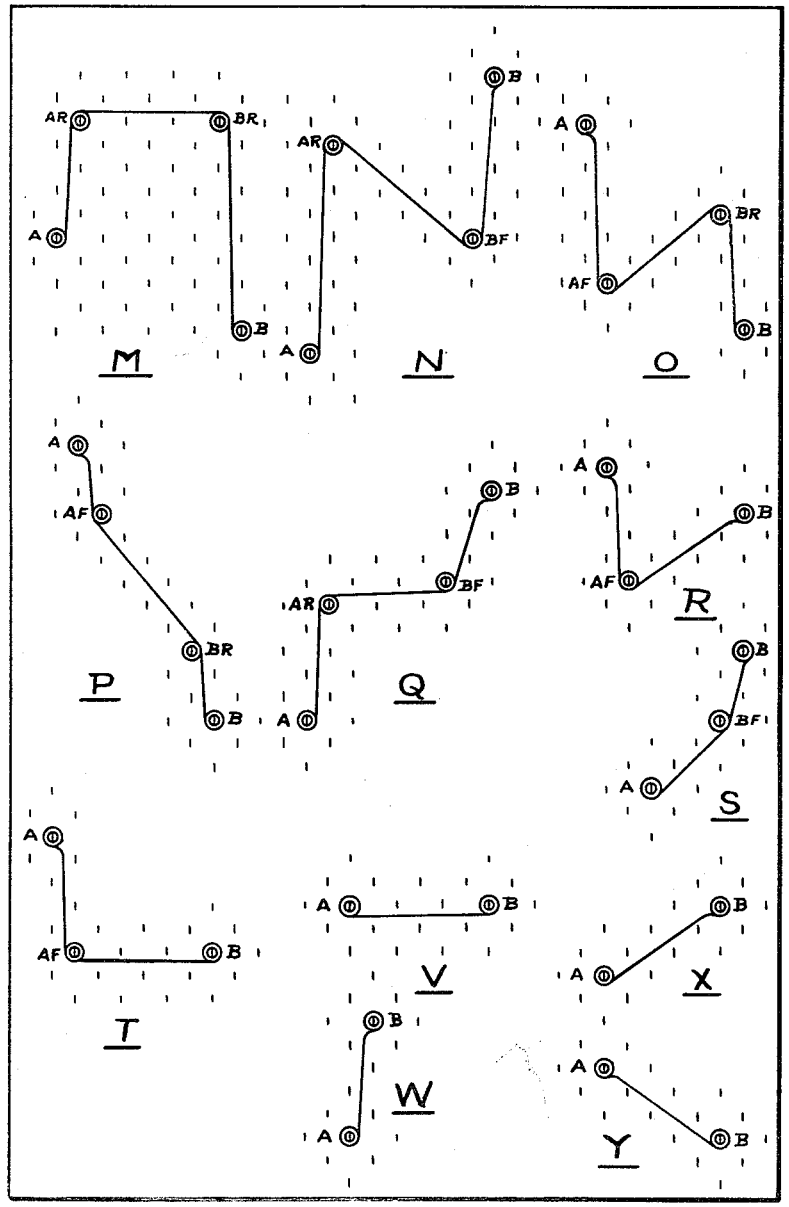
FIGURE 17 is a diagrammatic view of a wiring panel illustrating several wiring patterns which apparatus according to the present invention is capable of making.

It is to be noted that the dressing fingers AR and BR do not participate in the formulation of the above described U-shaped pattern. FIGURE 17 shows examples of other patterns which may be formed by the above described apparatus. Pattern M, for example, is an inverted U and is formed by the tools A and B along with the dressing fingers AR and BR. For this pattern, the tool A is positioned first; then the tool B is positioned. Following this, the upper right hand corner of the U pattern is formed by the dressing finger BR moving in a Y direction, and then the upper left hand corner of the U pattern is formed by the dressing finger AR moving in a Y direction.

Patterns N, O, P and Q are Z shaped patterns. Pattern N, for example, is formed by the tools A and B along with dressing fingers AR and BF. To form this pattern the tool A is positioned first, followed by the positioning of the dressing finger BF. The tool B is positioned next, forming the right side of the Z pattern, followed by the positioning of the dressing finger AR which forms the upper corner. Patterns O, P and Q are formed by the components as shown on the drawing.

Patterns R, S and T are angle patterns. These are simpler patterns which are actually parts of the above described U and Z patterns, and are formed by the components as indicated on the drawings. Patterns V, W, X and Y are straight line patterns which, again, are merely parts of the above discussed patterns, and are formed by the tools A and B, alone.

The above discussed patterns are merely exemplary of the great variety of patterns which may be formed by the apparatus of the present invention.

What is claimed is:

1. In automatic wiring apparatus the combination comprising:
   a first wiring tool having means for supporting and guiding a wire; a second wiring tool mounted for movement relative to said first tool along two transversely disposed coordinate axes, and having means for gripping a wire guided by said first tool;
   a first dressing finger mounted for movement relative to said first tool along one of said coordinate axes;
   a second dressing finger mounted for movement with said second tool relative to said first tool along the other of said coordinate axes, and mounted for movement relative to said second tool along said one coordinate axis; said movements of said second dressing finger occurring along both of said coordinate axes relative to said first tool and to said first dressing finger;
   and said dressing fingers being engageable with a wire suspended between said tools to define, with said tools, predetermined patterns for said wire.

2. The invention set forth in claim 1:
   wherein said second tool and said second dressing finger are mounted on a carrier for said movement relative to each other along said one coordinate axis; wherein said carrier is mounted for movement relative to said first tool along said other coordinate axis;
   and including a first drive means for moving said carrier along said other coordinate axis; a second drive means for moving one of the members mounted on said carrier along said one coordinate axis; a third drive means for moving said first dressing finger along said one coordinate axis; and selectively operable interlock means for coupling said second tool and said second dressing finger.

3. In automatic wiring apparatus the combination comprising:
   a first wiring tool having means for supporting and guiding a wire; a second wiring tool mounted for movement relative to said first tool along two transversely disposed coordinate axes, and having means for gripping a wire guided by said first tool;
   first and second dressing fingers mounted on either side of said second tool for movement with said second tool relative to said first tool along one of said coordinate axes, and mounted for individual movement relative to said second tool along the other of said coordinate axes;
   and said dressing fingers being engageable with a wire suspended between said tools to define, with said tools, predetermined patterns for said wire.

4. The invention set forth in claim 3:
   wherein said second tool and said first and second dressing fingers are mounted on the carrier for said movement relative to each other along said other coordinate axis; wherein said carrier is mounted for movement relative to said first tool along said one coordinate axis;
   and including a first drive means for moving said carrier along said one coordinate axis; a second drive means for moving one of the members mounted on said carrier; and selectively operable interlock means for coupling the other members on said carrier to said one member.

5. In automatic wiring apparatus the combination comprising:
   a first wiring tool having means for supporting and guiding a wire;
   a second wiring tool mounted for movement relative to said first tool along two transversely disposed coordinate axes, and having means for gripping a wire guided by said first tool;
   first and second dressing fingers mounted on either side of said first tool for individual movement relative to said first tool along one of said coordinate axes;
   and said dressing fingers being engageable with a wire suspended between said tools to define, with said tools, predetermined patterns for said wire.

6. In automatic wiring apparatus the combination comprising:
   a first wiring tool having means for supporting and guiding a wire; a second wiring tool mounted for movement relative to said first tool along two transversely disposed coordinate axes, and having means for gripping a wire guided by said first tool;
   first and second dressing fingers mounted on either side of said second tool for movement with said second tool relative to said first tool along one of said coordinate axes, and mounted for individual movement relative to said second tool along the other of said coordinate axes;
   third and fourth dressing fingers mounted on either side of said first tool for individual movement relative to said first tool along the other of said coordinate axes;
   and said dressing fingers being engageable with a wire suspended between said tools to define, with said tools, predetermined patterns for said wire.

7. In automatic wiring apparatus the combination comprising:
   a first wiring tool movable along two transversely disposed coordinate axes; a second wiring tool movable relative to said first tool along said two transversely disposed coordinate axes and having means for carrying a wire with respect to said first tool;
   first and second dressing fingers disposed on either side of said second tool, movable with said second tool relative to said first tool along one of said coordinate axes and individually movable relative to said second tool along the other of said coordinate axes;
   third and fourth dressing fingers, disposed on either side of said first tool, movable with said first tool along said one of said coordinate axes and individually movable relative to said first tool along said other of said coordinate axes;
   and said dressing fingers being engageable with a wire suspended between said tools to define, with said tools, predetermined patterns for said wire.

8. In automatic wiring apparatus the combination comprising:
   a first carrier and a second carrier mounted for rectilinear movement relative to each other;
   a first wrapping tool and associated first and second dressing fingers mounted on said first carrier for rectilinear movement relative to each other, said first and second dressing fingers being movable individually relative to said first tool;
   a second wrapping tool and associated third and fourth dressing fingers mounted on said second carrier for rectilinear movement relative to each other, said third and fourth dressing fingers being movable individually relative to said second tool; said movements of said tools and said dressing fingers being transverse to the movements of said carriers;
   drive means for said carriers, said tools, and said dressing fingers; one of said tools having means for carrying a wire with respect to the other of said tools; and said dressing fingers being engageable with a wire suspended between said tools to define, with said tools, predetermined patterns for said wire.

9. In automatic wiring apparatus the combination comprising:
   a frame having guide tracks; a first carrier and a second carrier mounted for rectilinear movement relative to each other on said guide tracks; said carriers having guide tracks disposed transversely to said first named guide tracks;
   a first wrapping tool and associated first and second dressing fingers mounted for independent rectilinear movement on the guide tracks of said first carrier;

said first and second dressing fingers being positioned on either side of said first wrapping tool and being movable individually relative thereto;

a second wrapping tool and associated third and fourth dressing fingers mounted for independent rectilinear movements on the guide tracks of said second carrier; said third and fourth dressing fingers being positioned on either side of said second wrapping tool and being movable individually relative thereto;

drive means for positioning said carriers on said frame guide tracks; drive means for positioning said tools and said dressing fingers on respective carrier guide tracks; means associated with said first tool for guiding a continuous length of wire gripped by said second tool; and said dressing fingers being engageable with a wire suspended between said tools to define, with said tools, predetermined patterns for said wire.

10. In automatic wiring apparatus the combination comprising:

a frame having guide tracks; a first carrier and a second carrier mounted for independent rectilinear movement on said guide tracks; each of said carriers having guide tracks disposed transverse to said first named guide tracks;

a first wrapping tool and associated first and second dressing fingers mounted for rectilinear movement relative to each other on the guide tracks of said first carrier; a second wrapping tool and associated third and fourth dressing fingers mounted for rectilinear movement relative to each other on the guide tracks of said second carrier;

drive means for said second carrier; selectively operable interlock means coupling said first and second carriers for driving said first carrier through said second carrier;

drive means for said first dressing finger; selectively operable interlock means coupling said first wrapping tool and said second dressing finger to said first dressing finger for selectively driving said members through said first dressing finger;

drive means for said third dressing finger; selectively operable interlock means coupling said second wrapping tool and said fourth dressing finger to said third dressing finger for selectively driving said members through said third dressing finger;

and selectively operable means for locking each of said carriers, said tools, and said dressing fingers in selected positions on respective guide tracks.

11. In automatic wiring apparatus the combination comprising:

a frame having guide tracks; a first carrier and a second carrier mounted for rectilinear movement relative to each other on said guide tracks; each of said carriers having guide tracks disposed transversely of said first named guide tracks;

a first wrapping tool carriage and first and second dressing finger carriages mounted for rectilinear movement relative to each other on the guide tracks of said first carrier; said dressing finger carriages disposed on either side of said tool carriage for individual movement relative thereto;

a second wrapping tool carriage and third and fourth dressing finger carriages mounted for rectilinear movement relative to each other on the guide tracks of said second carrier; said last named dressing finger carriages disposed on either side of said second tool carriage for individual movement relative thereto;

drive means for moving said carriers and said carriages on respective guide tracks;

said wrapping tool carriages carrying respective first and second wrapping tools disposed to be initially positioned adjacent to each other by said carriers and said tool carriages; said wrapping tools having means for suspending a wire in a plane;

said dressing finger carriages carrying respective first, second, third, and fourth dressing fingers for engaging said wire; said dressing fingers being normally disposed in a first position displaced from the plane of said wire; means associated with each of said dressing finger carriages for selectively moving the respective dressing finger from said first position to a second position traversing the plane of said wire; and said dressing fingers, in said second position, being engageable with said wire to define, with said tools, predetermined patterns for said wire.

12. In automatic wiring apparatus the combination comprising:

first and second carriers mounted for rectilinear movement in a first direction; first and second tool carriages mounted respectively on said first and second carriers for rectilinear movement in a second direction transverse to said first direction;

first and second wrapping tools mounted respectively on said first and second tool carriages; said tools being selectively movable in a plane, through the movements of said carriers and said carriages, between positions adjacent to each other and positions spaced from each other; one of said tools having means for gripping the end of a wire guided adjacent to the other of said tools, thereby suspending the wire between said tools in said plane;

first and second dressing finger carriages mounted on said first carrier, on opposite sides of said first tool carriage, for movements in said second direction between positions adjacent to said first tool carriage and positions spaced therefrom; third and fourth dressing finger carriages mounted on said second carrier, on opposite sides of said second tool carriage, for movement in said second direction between positions adjacent to said second tool carriage and positions spaced therefrom;

first, second, third and fourth dressing fingers, mounted on respective dressing finger carriages, for engaging a wire suspended between said tools; means for selectively moving said dressing fingers, relative to respective carriages, from a first position to a wire engaging position; and said dressing fingers being movable into said wire engaging position, when said tools have moved away from each other, to engage a wire suspended between said tools and to displace said wire, in said plane, from a line between said tools.

13. In automatic wiring apparatus the combination comprising:

a first wiring tool and a second wiring tool each movable along two transversely disposed coordinate axes; said tools having means for supporting opposite ends of a wire in a plane;

first and second dressing fingers mounted for individual movement relative to said first tool along one of said coordinate axes; third and fourth dressing fingers mounted for individual movement relative to said sceond tool along said one coordinate axis;

said second tool and said third and fourth dressing fingers mounted for movement, as a group, relative to said first tool and said first and second dressing fingers, as a group, along the other of said coordinate axes;

in operation, said tools being movable from positions initially adjacent to each other to positions spaced along said other coordinate axis and suspending a wire therebetween; and said dressing fingers having means selectively engageable with a wire suspended between said tools for displacing said wire in said plane along said one coordinate axis to define a predetermined planar pattern for said wire.

14. In automatic wiring apparatus the combination comprising:

a frame having guide tracks; a first carrier and a second carrier mounted for rectilinear movement relative to each other on said guide tracks; each of said carriers having guide tracks disposed transversely to said frame guide tracks;

a first wrapping tool carriage and first and second dressing finger carriages mounted for rectilinear movement relative to each other on the guide tracks of the said first carrier, said dressing finger carriages disposed on opposite sides of said tool carriage; a second wrapping tool carriage and third and fourth dressing finger carriages mounted for rectilinear movement relative to each other on the guide tracks of the second carrier, said last named dressing finger carriages disposed on opposite sides of said second tool carriage;

drive means for moving said second carrier on said frame guide tracks; selectively operable interlock means coupling said first and second carriers, for moving said first carrier through second carrier drive means;

drive means for moving said first dressing finger carriage on respective guide tracks; selectively operable interlock means for coupling said first wrapping tool carriage to said first dressing finger carriage and for coupling said second dressing finger carriage to said first tool carriage, so that said tool carriage and said second dressing finger carriage are moved by said first dressing finger carriage drive means;

drive means for moving said third dressing finger carriage on respective guide tracks; selectively operable interlock means for coupling said second wrapping tool carriage to said third dressing finger carriage and for coupling said fourth dressing finger carriage to said second wrapping tool carriage, so that said second tool carriage and said fourth dressing finger carriage are moved by said third dressing finger carriage drive means;

wrapping tools, mounted on each of said tool carriages, having means for suspending a wire in a plane defined by the movements of said tools;

first, second, third and fourth dressing fingers mounted on respective dressing finger carriages, each having means for engaging a wire and each being movable from a first position, relative to its respective carriage, to a second position wherein it traverses the plane of a wire suspended between said tools; means for actuating said dressing fingers between said first and second positions; said dressing fingers, through relative movements of said carriages, displacing said wire in said plane from a line between said tools;

and means for locking each of said carriers and said carriages on respective guide tracks, when said carriers and said carriages have been moved to selected positions by said drive means.

References Cited by the Examiner

UNITED STATES PATENTS

| | | | |
|---|---|---|---|
| 2,648,356 | 8/53 | Beaulieu et al. | 140—122 XR |
| 2,905,400 | 9/59 | Mallina | 242—7.5 |
| 3,019,822 | 2/62 | Jacobson | 140—71 |
| 3,030,985 | 4/62 | Jacobson | 140—71 |

CHARLES W. LANHAM, *Primary Examiner.*

RICHARD A. WAHL, WILLIAM F. PURDY, *Examiners.*